Figure 1:
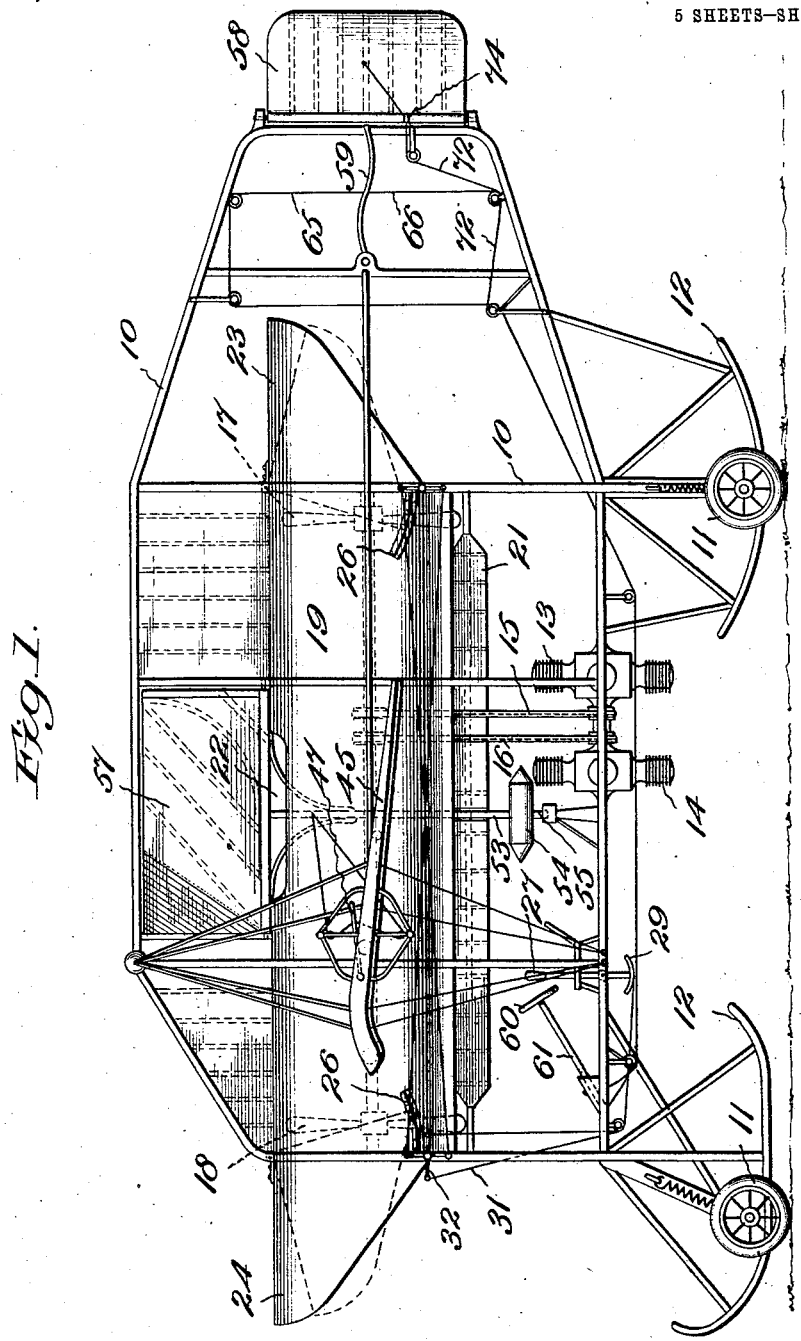

M. A. PARISANO.
FLYING MACHINE.
APPLICATION FILED DEC. 21, 1911.

1,074,525.

Patented Sept. 30, 1913.
5 SHEETS—SHEET 1.

WITNESSES:
Geo. H. Byrne.
Katharine C. Mead.

INVENTOR
Michael A. Parisano
BY
Wilkinson, Fisher, Witherspoon and MacKaye
ATTORNEYS

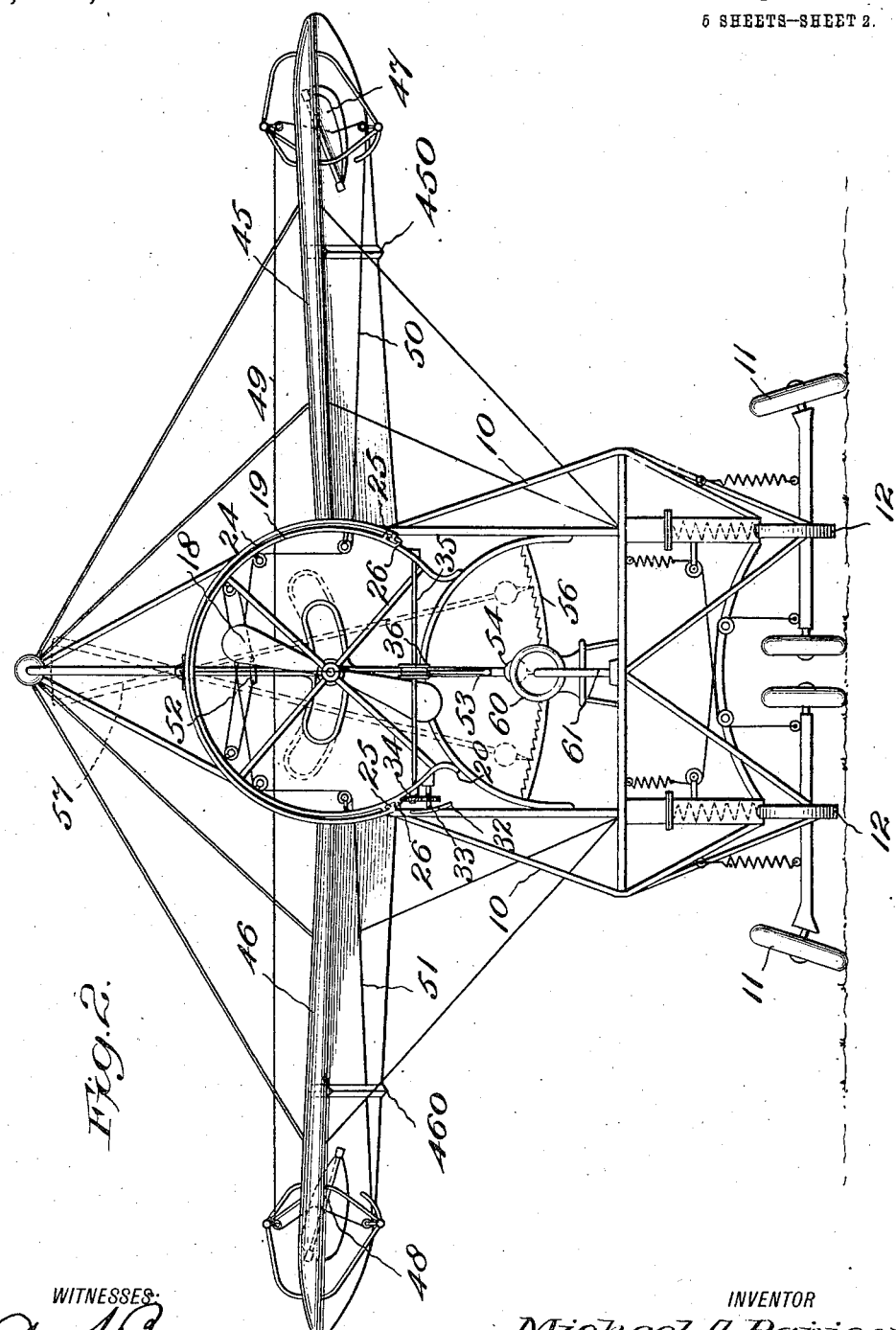

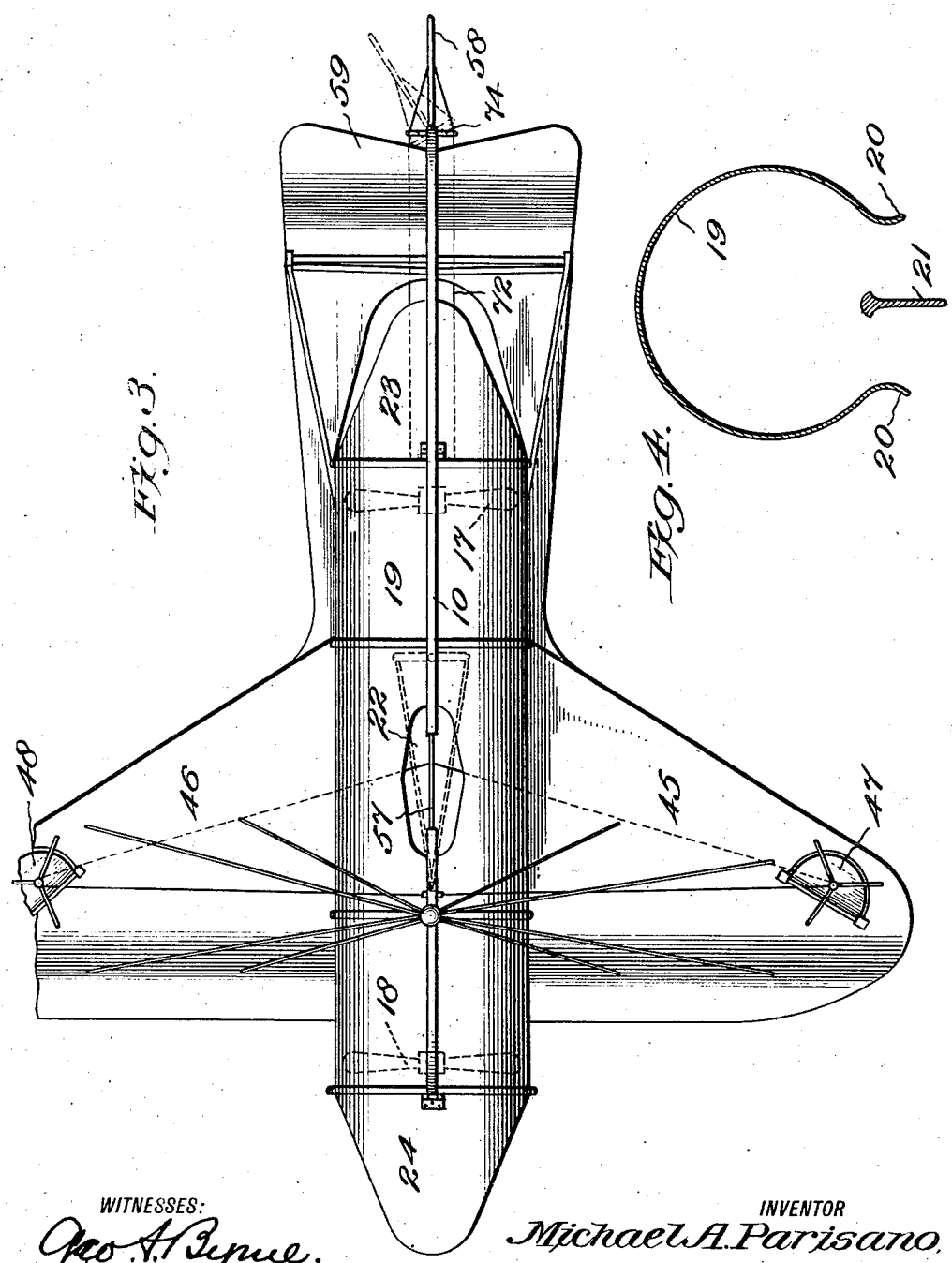

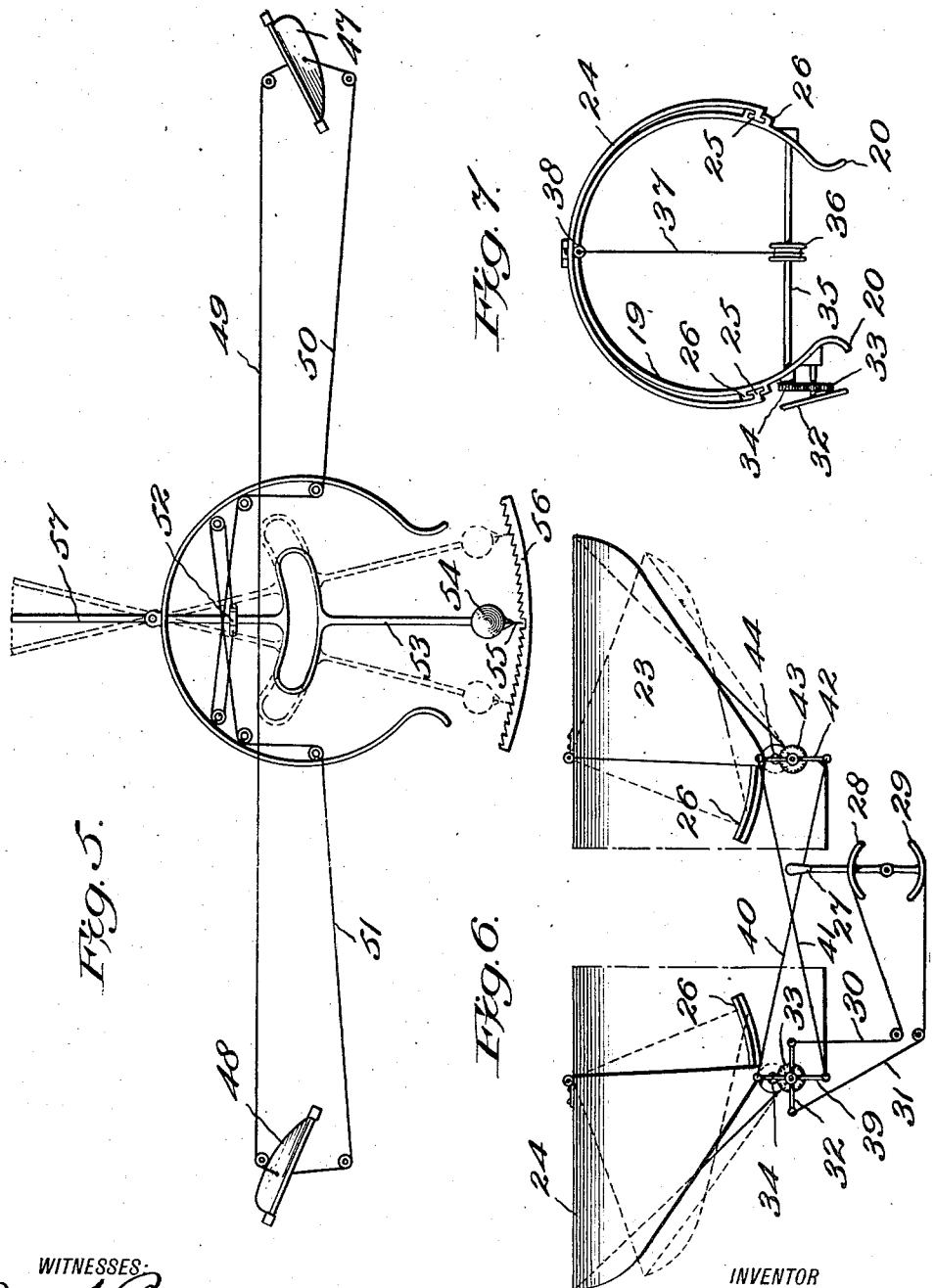

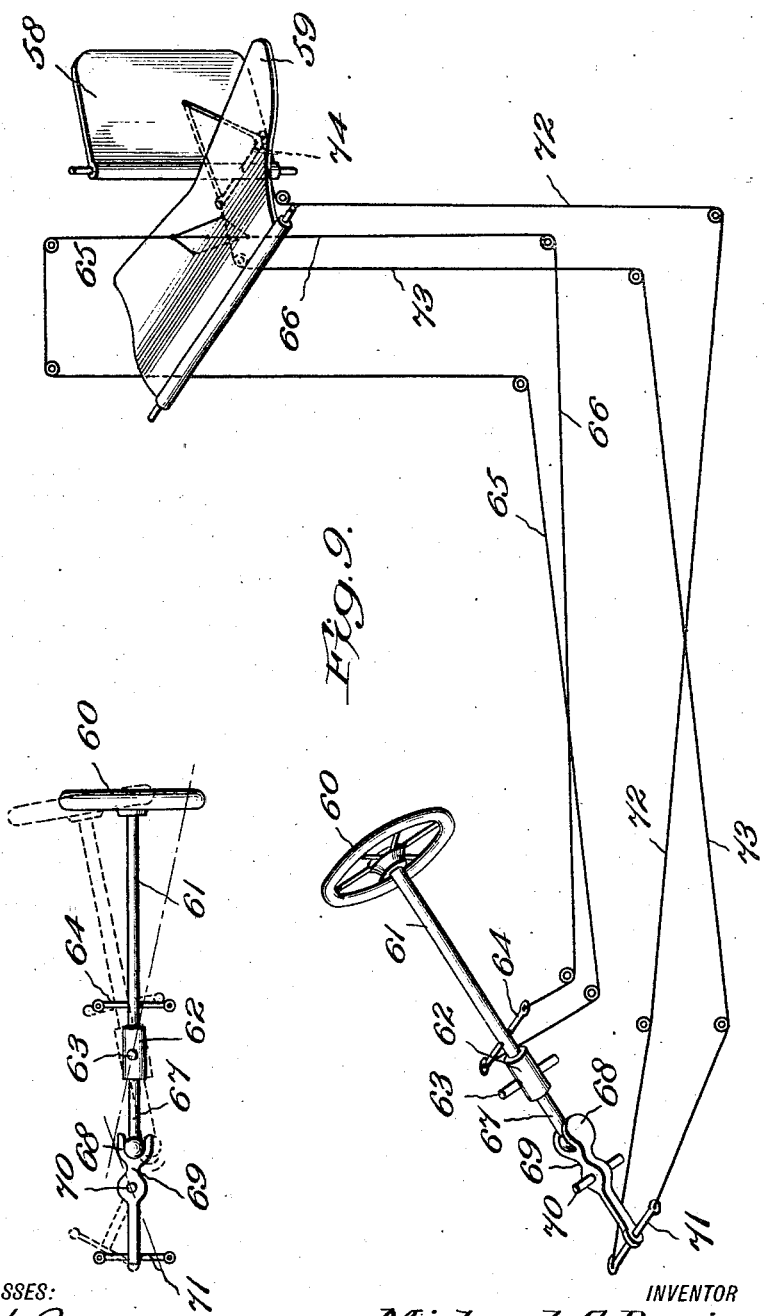

UNITED STATES PATENT OFFICE.

MICHAEL A. PARISANO, OF NEW YORK, N. Y.

FLYING-MACHINE.

1,074,525.   Specification of Letters Patent.   Patented Sept. 30, 1913.

Application filed December 21, 1911. Serial No. 667,156.

*To all whom it may concern:*

Be it known that I, MICHAEL A. PARISANO, a citizen of the United States, residing at New York city, in the county of New York and State of New York, have invented certain new and useful Improvements in Flying-Machines; and I do hereby declare the following to be a full, clear, and exact description of the invention, such as will enable others skilled in the art to which it appertains to make and use the same.

My invention relates to improvements in heavier than air flying machines.

The principal objects of the invention are as follows:

To supply a reliable and instant acting automatic stabilizer for correcting any tendency of the machine to upset laterally, such stabilizer being preferably combined with means termed a damper which prevents operation due to small and insignificant impulses. It is also within my invention to employ the damper in question with other forms of stabilizer than with that specifically claimed herein.

To provide an improvement in the form of machine shown in my Letters Patent No. 987596, dated March 21st, 1911, whereby the driving pressure exerted by one or more propellers within a draft cylinder may be caused to exert an upward or buoyant tendency, and whereby a certain proportion of the air driven by such propeller or propellers may be directed past a keel in such a manner as to tend to promote the stability of the device.

To provide an improvement in the aforesaid patented flying machine, whereby the same may be converted instantly into a parachute in case of need and the safety of the device be thereby greatly enhanced.

To provide an improved steering means whereby a single wheel may be appropriately manipulated for commanding either horizontal or vertical steering or both at will.

To provide an improved form of rudder for vertical steering, whereby a more efficient grip on the atmosphere is secured.

My invention is illustrated in a preferred form in the accompanying drawings, wherein—

Figure 1 is a side elevation of the machine in action, Fig. 2 is a front elevation of the same, Fig. 3 is a top plan view of the same, Fig. 4 is a sectional view through the draft tube and keel, Fig. 5 is a sectional view showing the automatic stabilizer, Fig. 6 is a diagrammatic view showing the operation of converting the draft tube into a parachute, Fig. 7 is an end view of the draft tube, showing details of the means for converting it into a parachute, Fig. 8 is a plan view of the steering wheel for double function and Fig. 9 is a combined perspective and diagram showing the connections between said wheel and the horizontal and vertical rudders.

The frame work of the machine is indicated at 10 and the same is mounted upon wheels 11 and skids 12 in any well known manner but preferably in the manner indicated in Fig. 2, wherein certain novel features are embodied and which are claimed in another pending application of mine, Serial Number 667,155. These novel features form no part of the invention claimed in this application. The two motors 13 and 14 operate through the belts 15, 16, to revolve the propellers 17, 18 in opposite directions for the purposes set forth in my aforesaid Letters Patent.

The propellers 17 and 18 revolve symmetrically within what may be termed a draft tube 19 which differs from the draft tube shown in my said patent in that the same is open from end to end of the bottom and has the edges at the bottom, preferably flaring outward at 20 all as clearly shown in Fig. 4. I prefer to provide a keel 21, situated immediately under the draft tube and in the opening between the edges 20. The function of this keel is to promote stability and this is accomplished by the rush of air outward and downward from the tube 19 through the opening at the bottom, causing a strong current which resists any tendency of the keel 21 to depart from the vertical position.

The pressure created behind the forward propeller 18 within the draft tube, instead of being equally distributed outward as in my formed patent above referred to, is not resisted at the bottom where the air is free to emerge from the tube. The consequence is that there is an unbalanced pressure transverse to the tube, the resultant of which is a distinct upward pressure which serves to increase the buoyancy of the entire machine and this is an important feature of my invention.

Another feature of my invention is the means whereby the draft tube may be converted very readily into a parachute and this is accomplished by using the tilting ends of the draft tube, which are shown in my former patent above referred to, in a novel manner.

Instead of turning one end down and the other up for purposes of steering as in my former patent, I provide means whereby both ends are to be depressed at once, thereby cupping the tube, so to speak, and giving it a form appropriate to a parachute. At the same time I provide a single central opening 22 in the top of the tube 19 through which the upward rushing air is free to find an exit as the machine falls. By this expedient, an efficient parachute is produced without additional apparatus. To accomplish this, various means may be employed and I have shown as an example the two ends 23, 24 pivoted at the top to the ends of the main tube 19 and furnished with flanges 25 which are free to slide within curved guides 26 on the outer surface of the main tube. This is clearly shown in Figs. 2, 6 and 7 and in Figs. 1 and 6. The depressed position of the ends 23, 24 is indicated in dotted lines.

The position of the ends 23 and 24 is governed by a hand lever 27 within reach of the operator which lever is furnished with two curved parts 28, 29, to which are connected cables or ropes 30, 31, whose opposite ends are fixed to the ends of a lever 32 which serves to rotate a gear 33, meshing with a similar gear 34, whereby the shaft 35 is revolved, upon which is mounted a pulley 36. Over the pulley 36, a cord 37 passes, which is connected at 38 to the tip of the tilting end 34.

Fastened at right angles to the lever 32 is a similar lever 39, whose ends are connected by cables or cords 40, 41 to another similar lever 42, whereby the gear 43 is made to drive a similar gear 44 for the purpose of depressing the tilting end 23, simultaneously with the depression of the end 24.

Inspection of Fig. 6 will show that by appropriate movement of the lever 27, the desired depression of the ends 23 and 24 can be accomplished, and in fact the position of those ends may be determined at any time. It will also be observed that by the use of the large and small gears 33, 34 and 43, 44 respectively, a relatively small movement of the lever 27 will accomplish a greater movement of the end 23, 24.

The keel 21, being flared outward at its upper edge, acts, when the tube used as a parachute, to divert the upwardly rushing air outward toward each side, so as to cause it to move along the inner surfaces of the tube, preventing direct escape through the top opening, and thus increasing the parachute effect of the device. It is furthermore to be noted that the upper edge of the keel 21 projects into the bottom of the tube, and serves materially to oppose the tendency of either propeller to set up an idle whirling or rotation of air within the tube. By so doing, this keel tends to promote the efficient action of the propellers.

In the production of an improved stabilizer, I provide the usual wings 45, 46, the preferred shape of which is shown in Figs. 1 and 3, and on these wings are mounted valve-like minor wings or ailerons shown at 47, 48. These ailerons normally cover and occupy properly shaped openings in the main wings and in normal operation constitute a virtual portion of the main wings.

The ailerons 47, 48 are connected by cords in such a manner that, upon movement of either aileron up or down, the other aileron will move in the opposite direction, that is to say, down or up. In the preferred form shown this is accomplished by connecting together the upper sides of the two ailerons by a proper cable or cord 49 running over appropriate pulleys in a well known manner, and connecting the lower side of each aileron by means of small cords 50, 51, to the opposite sides of a collar 52 upon a pendulum 53, hanging within the draft tube. This is plainly shown in Fig. 5 and in Fig. 2.

The pendulum 53 carries an appropriate weight 54 with pointed ends to lessen air resistance and the pointed tip of the pendulum shown at 55, preferably made springlike, plays over a curved bar 56 provided with upwardly extending teeth which serve to impede the movement of the pendulum with relation to the bar 56 and the frame of the machine to which the bar 56 is fixed.

It will be obvious that, since the pendulum 53, always tends to take a vertical position, any departure from the vertical due to lateral tilting of the machine will cause the ailerons to be swung out of registry with the openings in the main wings. If, for instance, the device be supposed to tilt so as to lower the left hand side in Fig. 2, the aileron 48 will be depressed and the aileron 47 will be lifted and each will stand inclined more or less according to the degree of tipping, to the general surface of the main wings. These inclined planes acting upon the rushing air will have a strong tendency to counteract the tilting effect and to return the machine to the horizontal.

I have shown in my drawings the pendulum 53 combined with the jib or sail 57, the action of which is described in my former patent above alluded to and needs no description here. It is to be understood that this combination of the automatically moved ailerons with the jib or sail is not essential to the present invention. The combination is illustrated in order to show the possibility of utilizing both stabilizing agencies in one structure. It is also to be understood that the keel 21 will contribute to the general stabilizing result.

The office of the toothed bar 56, acting in connection with the flexible end or tip 55 on the pendulum is to prevent operation of the ailerons by reason of small accidental causes. At the same time, once the pendulum is set in motion, the flexible tip 55 will sweep rapidly over the teeth 56 without appreciable retardation. My improvement is, therefore, distinguished from those prior devices in which rollers, etc., act to retard or damp the action of the pendulum throughout its movement.

The bar 56 may be fitly termed a normally restraining bar as distinguished from a continually retarding means.

It will be noted that the line of pivoting or flexible attachment of each aileron is set slanting with respect to the direction of travel of the whole apparatus, and preferably each aileron is made broader at the part next the forward end of each line of pivoting. The result of this arrangement is greatly to lessen the shock of a sudden movement of the ailerons, and to diminish the tendency of these elements to retard the movement of the machine when they are swung outward, by reason of the fact that the air is diverted inward toward the median line of the machine as well as upward or downward as the case may be.

I have found that, where lateral wings are used of the kind herein shown and described, there is often a material escape of air laterally along the under surfaces of the wings owing to their inclination upward and outward, and, in order to oppose the progress of air laterally along the under surfaces of the wings, I have adopted shallow windbreaking ridges 450 on the under surfaces. I prefer to construct these, as shown, with an inclined surface on the inner side, whereby the air which seeks to escape laterally is forced downward, with a resulting upward reaction which aids in supporting the entire device.

The rudder for steering in the horizontal plane is shown at 58 and that for steering in the vertical plane is shown at 59. I shall refer hereafter to the rudder 58 as the vertical rudder in view of its function, and to the rudder 59 as the horizontal rudder.

One feature of my present invention is the formation of the rudder 59 with a gentle reversed curve as clearly shown in Figs. 1 and 9. I find that by providing a gentle reversed curve in this manner, a much more efficient gripping is obtained on the air current which passes across the faces on the horizontal rudder 59 whereby an improved result in the steering of the machine is obtained.

While it is not essential to my invention, I have nevertheless preferred to provide a single steering wheel or equivalent means for the control of both rudders 58 and 59 and I have shown one of various methods whereby this end may be accomplished. This is shown in Figs. 8 and 9.

The hand wheel 60 which is used to control both rudders is mounted upon the end of the shaft 61 whose end revolves in a sleeve 62 in which it is firmly held. Said sleeve 62 is pivoted to permit a swinging movement, as shown in dotted lines in Fig. 8, of the shaft 61 and sleeve 62. The pivotal support for the sleeve is shown at 63. The cross bar 64 on the shaft 61 is attached at its two ends to the cables or cords 65, 66 respectively; and these cords pass over proper pulleys in a well known manner and extend to opposite faces of the horizontal rudder 59 where they are attached as clearly shown.

The sleeve 62 has an extension 67, forming one member of a universal joint, the other member of which is the socket 68 on the end of the lever 69 pivoted at 70 as shown in dotted lines in Fig. 8. The lever 69 is extended beyond the pivot 70 and carries a cross bar 71 whose ends are connected to cables or cords 72, 73 respectively. These cords are carried over proper pulleys in a well known manner and are attached to opposite ends of a cross bar 74 on the horizontal rudder 58 as shown in Figs. 1 and 9.

It will be seen by inspection of Figs. 8 and 9 that rotation of the shaft 61 by means of the wheel 60 will produce a swinging movement up or down of the horizontal rudder 59 while a swinging movement, as indicated in dotted lines in Fig. 8, will produce a tension upon one or the other of the cables 72, 73 whereby the vertical rudder 58 is operated. This single wheel 60 may be made to control either of the two rudders independently of the other or both together.

Many changes might be made in the construction and arrangement of the parts of my improved machine without departing from the spirit of my invention and I do not intend to limit myself to the details herein shown and described.

What I claim is—

1. In a flying machine, stabilizing means comprising a pendulum for actuating the same, a curved bar having teeth, and a resilient tip on said pendulum normally engaging said teeth to restrain the pendulum from small accidental movements and adapted to sweep over the same, without substantial retardation on occurrence of wide movements of the pendulum, substantially as described.

2. In a flying machine, automatic stabilizing means comprising a pendulum, and a curved toothed bar adapted to engage the tip of said pendulum so as to retard relative movement of the pendulum and the frame-work of the machine, substantially as described.

3. In a flying machine, having lateral supporting wings, ailerons supported so as to be capable of swinging through proper openings in the said wings, a pendulum suitably connected to said ailerons, and a curved and toothed bar engaging the tip of said pendulum for damping movement thereof, substantially as described.

4. In a flying machine having lateral wings, movable ailerons mounted thereon, a stabilizing pendulum suitably connected to said ailerons, a swinging jib suitably connected to said pendulum, and a curved and toothed bar engaging the tip of said pendulum for damping movement thereof, substantially as described.

5. In a flying machine, a draft cylinder or tube of substantially uniform cross section, open at front and back and along its under side, and a revoluble propeller located entirely within said tube, said propeller being arranged to compress the air within said tube and being materially smaller in diameter than said tube, substantially as described.

6. In a flying machine, a draft cylinder or tube open along its under side, a revoluble propeller within said tube, and means entering said tube through the opening beneath it for opposing idle rotation of the air within said tube, substantially as described.

7. In a flying machine, a draft cylinder or tube open along its under side, a revoluble propeller within said tube smaller in diameter than said tube, and a keel projecting through the opening under the same, sufficiently to oppose idle rotation of air within the tube, substantially as described.

8. In a flying machine, a draft cylinder or tube open along its under side, a revoluble propeller within said tube, said tube having an opening at the top and flaring edges along its under opening, and a keel placed along said opening and having its upper edge flaring upward so as to divert upward rushing air toward the two sides of the tube, substantially as described.

9. In a flying machine, a draft cylinder or tube open along its under side, an opening at the top, and flaring edges along its under opening, a revoluble propeller within said tube, a keel placed along said opening, and having its upper edge flaring upward, and depressible hoods at the ends of said tube by movement of which the tube may be converted into a parachute, substantially as described.

10. In a flying machine, a draft cylinder or tube open along its lower side and having an opening in its top wall, curved guides near the ends of said tube, and hood-shaped tiltable ends on said tube fitting outside of the same, and having flanges adapted to slide along said guides, substantially as described.

11. In a flying machine, lateral supporting wings inclined upward and outward and a shallow wind-breaking ridge V-shaped in cross section fixed in a general longitudinal direction along the under side of each wing between its outer and inner edges, adapted to impede the outward escape of air beneath said wings and, by diverting the air downward, to obtain a reactive lifting effect, substantially as described.

12. In a flying machine, lateral supporting wings inclined upward and outward, and a shallow fixed ridge having a sloping inward face, extending along the under side of each wing between its outer and inner edges, adapted to impede and downwardly divert outward air currents along the under surfaces of said wings, substantially as described.

In testimony whereof, I affix my signature, in presence of two witnesses.

MICHAEL A. PARISANO.

Witnesses:
H. S. MACKAYE,
KATHARINE C. MEAD.